United States Patent
Olry et al.

[19]

[11] Patent Number: 6,051,313

[45] Date of Patent: Apr. 18, 2000

[54] HYBRID YARN FOR THE FABRICATION OF FIBRE PREFORMS OF COMPOSITE PARTS, AND METHOD FOR ITS PREPARATION

[75] Inventors: Pierre Olry, Bordeaux; Dominique Coupe, Le Haillan; Renaud Duval, Les Cheres; Amina Zerdouk, Lyons, all of France

[73] Assignee: Societe Nationale D'Etude et de Construction de Moteurs D'Aviation, Paris, France

[21] Appl. No.: 08/952,742

[22] PCT Filed: May 20, 1996

[86] PCT No.: PCT/FR96/00748

§ 371 Date: Nov. 20, 1997

§ 102(e) Date: Nov. 20, 1997

[87] PCT Pub. No.: WO96/37646

PCT Pub. Date: Nov. 28, 1996

[30] Foreign Application Priority Data

May 24, 1995 [FR] France ................................ 95 06200

[51] Int. Cl.[7] ........................................................ D02G 3/16
[52] U.S. Cl. ........................... 428/371; 428/373; 428/374; 428/408; 156/148; 156/151; 156/229; 156/276; 57/3; 57/5; 57/9; 57/10; 57/11; 57/13
[58] Field of Search ..................................... 57/3, 5, 9, 10, 57/11, 13; 428/371, 373, 374, 408; 156/148, 151, 229, 276

[56] References Cited

FOREIGN PATENT DOCUMENTS

| 2584106 | 6/1988 | European Pat. Off. . |
|---|---|---|
| 0432439 | 6/1991 | European Pat. Off. . |
| 0489637 | 6/1992 | European Pat. Off. . |
| 0555134 | 8/1993 | European Pat. Off. . |
| 2608641 | 6/1988 | France . |
| 0059131 | 3/1991 | Japan . |

*Primary Examiner*—Richard Weisberger
*Attorney, Agent, or Firm*—Weingarten, Schurgin, Gagnebin & Hayes LLP

[57] ABSTRACT

A yarn is formed from discontinuous parallel fibers which are not twisted and which are held together by a covering yarn of sacrificial material wound around the fibers. The fibers comprise an intimate mixture of fibers of at least two different natures selected from carbon fibers or pre-oxidized polyacrylonitrile based carbon precursor fibers, or anisotropic or isotropic pitch based carbon precursor fibers, or phenolic or cellulosic based carbon precursor fibers, and ceramic fibers or ceramic precursor fibers. The mixture of fibers comprises, in its carbon state, at least 15% by weight of high strength fibers, having a tensile strength of at least 1500 MPa and a modulus of at least 150 MPa, and at least 15% by weight of fibers with a low Young's modulus of at most 100 GPa.

28 Claims, 2 Drawing Sheets

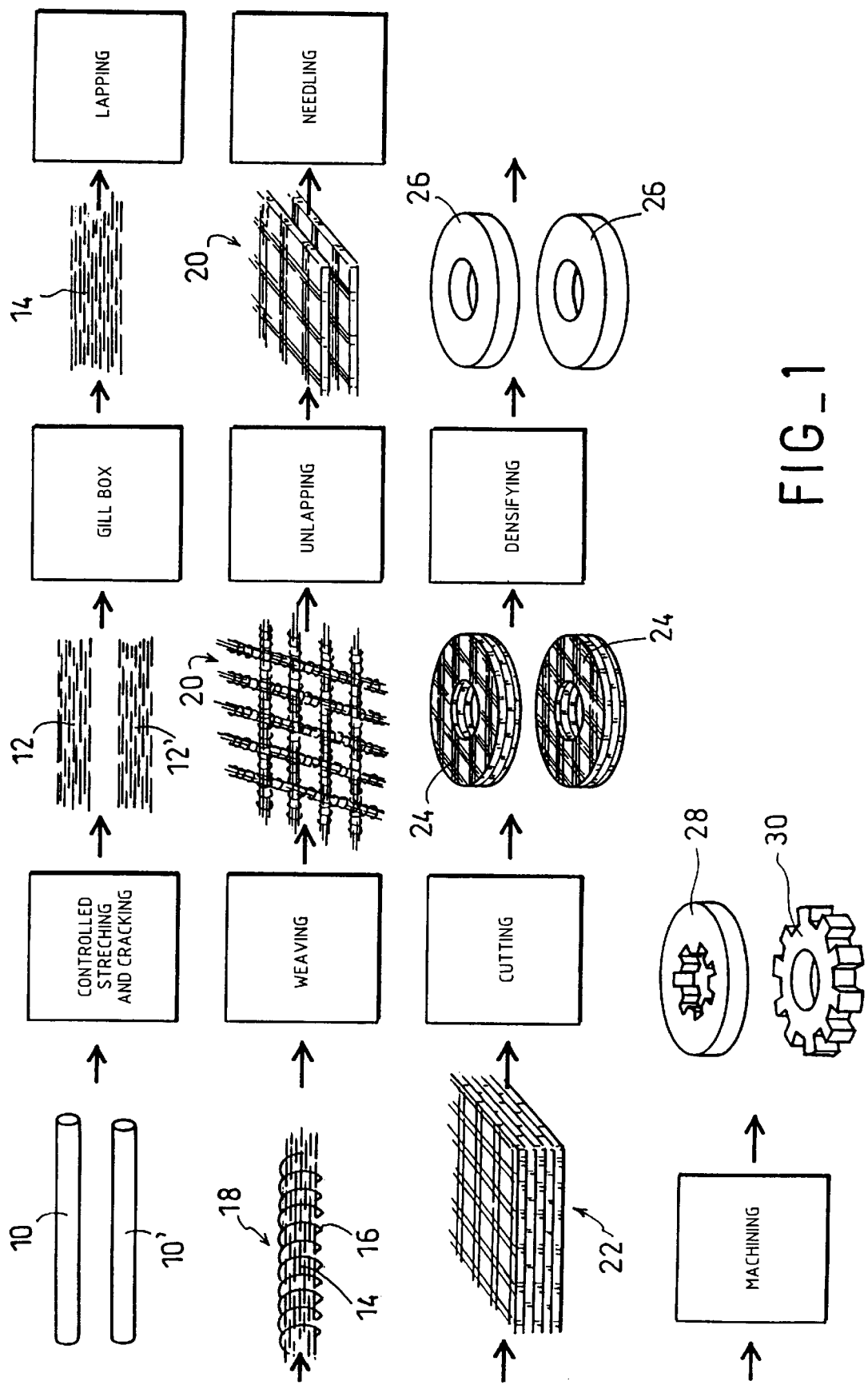
FIG_1

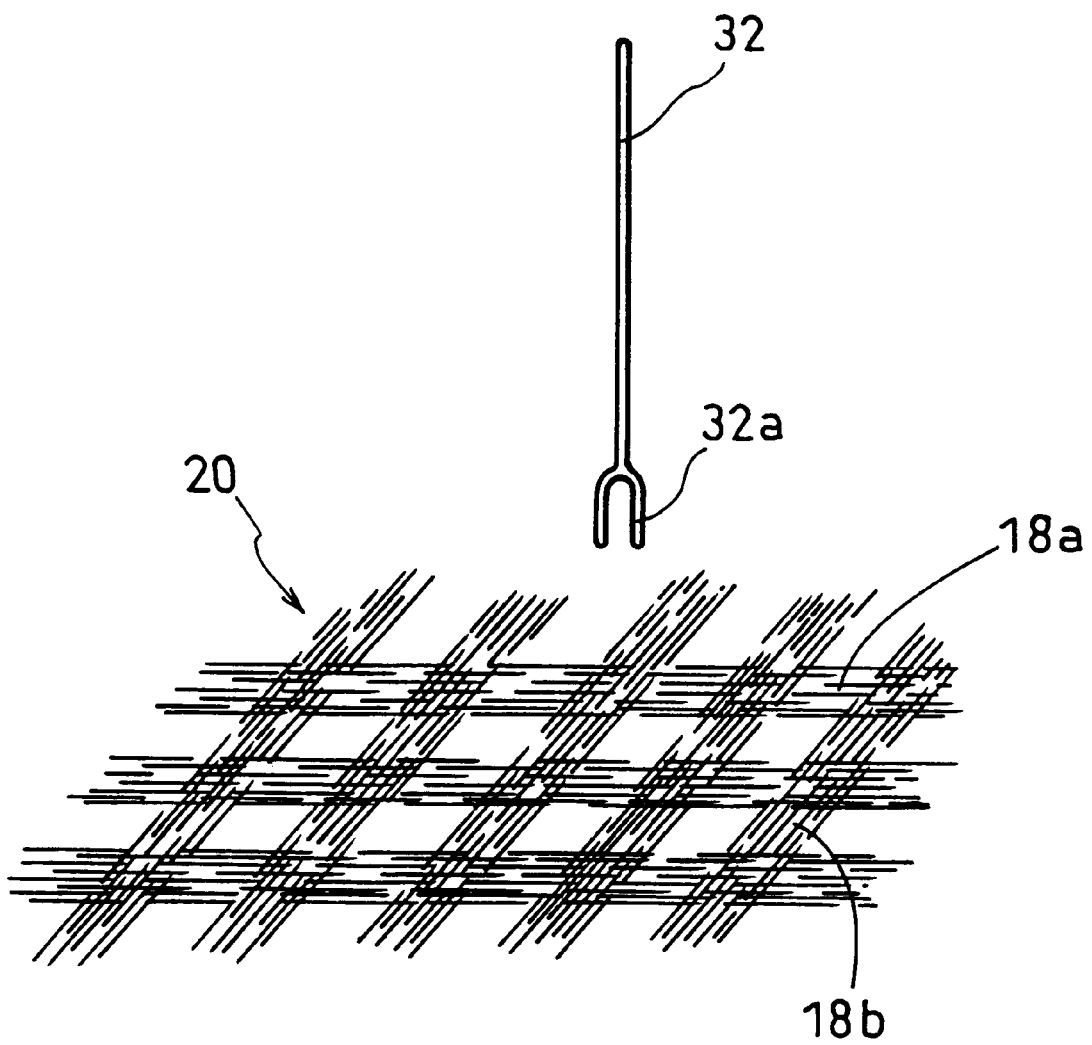
FIG_2

HYBRID YARN FOR THE FABRICATION OF FIBRE PREFORMS OF COMPOSITE PARTS, AND METHOD FOR ITS PREPARATION

The present invention relates to fabricating fiber preforms for composite material parts, and in particular it relates to a yarn for such fabrication.

One field of application of the invention is that of fiber preforms for composite material friction disks such as clutch disks, and principally brake disks.

Carbon-carbon (C—C) composite material brake disks are currently used in racing cars and, on a much larger scale, in rotor and stator multiple-disk brake systems for aircraft.

The manufacture of composite C—C brake disks comprises fabricating fiber preforms of carbon fibers and densifying the preforms with a carbon matrix which fills the majority of the initially accessible internal pores in the preforms.

Densification is conventionally carried out by chemical vapor infiltration or by chemical liquid infiltration, i.e., impregnation with a liquid carbon precursor and transformation of the carbon precursor by heat treatment.

Fiber preforms can currently be manufactured by superposing plies formed from a two-dimensional fiber fabric and interconnecting the plies by needling. The two-dimensional fiber fabrics can be in the form of woven fabrics or pre-needled unidirectional sheets. The plies are needled as they are stacked, preferably keeping a constant needling depth as described in French patent FR-A-2 584 106. The plies can be stacked flat and needled to obtain flat slabs from which annular brake disk preforms are cut. In order to avoid wasting a large amount of material, the plies can be formed from juxtaposed annular sectors cut from the two-dimensional fiber fabric, the lines separating the sectors being offset from one ply to the next.

Two-dimensional fiber fabrics in the form of woven fabrics or unidirectional sheets made of carbon yarns are not suitable for needling. Indeed, the needles showing barbs or forks have a tendency to break the continuous or twisted carbon filaments which constitute the yarns, rather than taking the fibers to place them transversely to the superposed plies. One way of solving this problem is to associate a web of carbon fibers with the two-dimensional fabric, which web provides fibers which can be entrained by the needles. Another solution consists of needling two-dimensional fabrics formed by fibers which are not of carbon but of a carbon precursor which is much more suitable for needling. The carbon precursor is transformed by applying heat treatment to the needled preform.

European patent EP-A-0 489 637 describes making two-dimensional fiber fabrics for fabricating preforms from a yarn composed essentially of discontinuous fibers (staple) which are parallel to one another and not twisted, the integrity of the yarn being ensured by a covering yarn of sacrificial material. Eliminating the covering yarn by dissolving or by heating frees the discontinuous fibers and allows needling even when the fibers are in the carbon state. Further, freeing the fibers allows them to expand into the entire volume of the preform, resulting in pores which are more easily and more uniformly accessible to the matrix material during the densification stage. Densification is thus more complete and more uniform.

For brake disks, the nature and the origin of the fibers constituting the preforms, the structure of the two-dimensional fabrics used to fabricate the preforms, the way in which the plies formed by these fabrics are connected together, in particular the needling parameters, the heat treatments to which the preforms can be subjected before densification, the nature of the matrix, and the mode of densification, are all factors which significantly influence the mechanical and tribological properties of the disks.

Particularly in the case of aircraft brakes, the disks used must not only have mechanical properties which enable them to withstand stresses both when hot and when cold, but they must also have tribological properties which enable them to behave satisfactorily in different situations: braking while taxiing cold (taxiing on runways before take-off), braking while taxiing hot (taxiing on runways after landing), braking during a normal landing, and emergency braking (interrupting take-off at the end of the take-off runway). However, in applications where the energy to be absorbed is more modest, it is desirable for the friction surfaces of the disks to reach a sufficient temperature very rapidly, and thus for the thermal conductivity of the composite material to be more limited than that which is required for emergency braking in aircraft, for example.

Bench tests carried out by the applicant have ascertained that the nature of the fibers in the preform has a great influence on the performance of brake disks and the aim of the present invention is to provide a yarn which is particularly suitable for fabricating fiber preforms for composite material parts, particularly but not exclusively brake disks. A further aim of the invention is to provide a method of fabricating such a yarn.

In one aspect of the invention, a yarn for fabricating fiber preforms for composite material parts comprises discontinuous parallel fibers which are not twisted and which are held together by a covering yarn of sacrificial material wound around the fibers, is characterized in that the yarn is a hybrid yarn in which the fibers comprise an intimate mixture of fibers of at least two different natures selected from polyacrylonitrile based carbon fibers or carbon precursor fibers, anisotropic pitch based carbon fibers or carbon precursor fibers, isotropic pitch based carbon fibers or carbon precursor fibers, phenolic based carbon fibers or carbon precursor fibers, cellulosic based carbon fibers or carbon precursor fibers and ceramic fibers or ceramic precursor fibers, and in that the mixture of fibers comprises carbon fibers or carbon precursor fibers which, in the carbon state, comprise at least 15% by weight and preferably at least 30% by weight of the mixture of fibers and constitute high strength carbon fibers, having a tensile strength of at least 1500 MPa, preferably at least 2000 MPa, and a modulus of at least 150 GPa, preferably at least 200 GPa.

The term "carbon fibers or carbon precursor fibers" here means fibers which are in the initial precursor state, for example in the polyacrylonitrile state, or in the carbon state after complete transformation of the precursor by carbonization, or in a state intermediate between the initial precursor state and the carbon state, for example pre-oxidized or semi-carbonized. Similarly, the term "ceramic fibers or ceramic precursor fibers" means fibers in the initial precursor state or in the ceramic state after complete transformation of the precursor, or in a state intermediate between the initial precursor state and the ceramic state, for example in a semi-ceramic state.

The mixture of fibers of different natures allows the fiber preforms to adapt better to the service conditions of the composite material parts. An essential characteristic of the invention resides in the fact that the hybridization is not performed by using yarns of different natures to produce the fiber preforms, but is performed at the level of the fibers making up the yarns, by using an intimate mixture thereof.

Thus in the case of brake disks, for example, the intimate mixture of fibers means that the "third body" which is created at the interface of the friction surfaces during friction is uniform over that entire surface and combines most effectively the properties contributed by the fibers of different natures.

A fiber preform for a composite material part is produced by forming a two-dimensional fiber fabric at least partially from a hybrid yarn, by superposing plies formed by the fiber fabric and, after eliminating the covering yarn, by needling the superposed plies.

The covering yarn is eliminated before or during superposition of the plies so that needling can be carried out progressively after each ply has been positioned, as described in FR-A-2 584 106 cited above.

When the hybrid yarn used to produce the fiber preform comprises fibers in the initial state or in a state intermediate between that state and the final carbon or ceramic state, the fibers are transformed to carbon or ceramic by heat treatment. The heat treatment can be carried out at any stage in fabricating the needled fiber preform, before densification, i.e., on the hybrid yarn, on the finished preform or at any intermediate stage. When the hybrid yarn comprises fibers in the carbon state, the needled fiber preform can also be heat treated at a temperature greater than 1300° C., up to 2300° C. This heat treatment chemically stabilizes the fibers, i.e., fiber composition is stabilized, in particular by eliminating residual nitrogen;—and structurally, i.e., perfecting to a greater or lesser extent the slabs of graphite planes;—and texturally, i.e., the orientation of these sheets with respect to the axis of the fiber and arrangement of these sheets and their convolutions with respect to the surface of the fiber. Heat treatment is preferably carried out at about 1600° C.

High strength carbon fibers are present to provide the required mechanical properties of the composite material. The percentage by weight of these fibers is preferably at least 30%.

It may be of advantage for the mixture of fibers to comprise carbon fibers or carbon precursor fibers which in the carbon state comprise 15% by weight of the mixture of fibers and constitute low modulus carbon fibers, i.e., with a Young's modulus of at most 100 GPa. The low modulus carbon fibers are selected from phenolic precursor carbon fibers, isotropic pitch precursor carbon fibers and cellulosic precursor carbon fibers.

In the carbon state, the percentage by weight of low modulus carbon fibers is preferably at least 30%.

When needling is carried out on carbon state fibers, not on precursor state fibers, the presence of low modulus carbon fibers is of advantage as the applicant has established that these fibers are preferentially and even mainly pulled through the superposed plies by the needles. Within the context of its application to brake disks and when the preform plies are parallel to the friction surfaces, a majority presence of low modulus fibers in a direction perpendicular to the friction surfaces means that the transverse stiffness of the disks is not too high. This means that the disks can deform elastically sufficiently to ensure friction over the whole extent of the friction surfaces, and not just locally, when these surfaces are not geometrically flat and parallel, for example following uneven wear.

The fact that the low modulus carbon fibers are displaced by the needles is probably something to do with the fact that high modulus carbon fibers—such as those of pre-oxidized polyacrylonitrile carbon precursor or those of anisotropic pitch carbon precursor—tend to be broken as they are discontinuous and not twisted. This is more the case when the diameter of the high modulus carbon fibers is larger. Thus the low modulus carbon fibers are selected almost exclusively on needling when the high modulus carbon fibers present in the hybrid yarn have a diameter of more than 8 μm, preferably more than 10 μm. Lower stiffness of the fiber preform and the composite material part in a direction perpendicular to the plies is thus guaranteed.

A further means of preferentially selecting the low modulus carbon fibers by needling consists in forming a two-dimensional fiber fabric in which the hybrid yarns extending in one direction comprise a significant proportion of low modulus carbon fibers, and by needling the fiber fabric using needles with an orientation which is selected so that they preferentially catch the fibers of the hybrid yarns oriented in that direction.

In a further aspect, the invention provides a method of fabricating a hybrid yarn as defined above.

The invention thus provides a method comprising steps consisting of:

providing ensembles of continuous filaments, each ensemble being constituted by filaments of the same nature selected from a polyacrylonitrile based carbon or carbon precursor, an anisotropic pitch based carbon or carbon precursor, an isotropic pitch based carbon or carbon precursor, a phenolic based carbon or carbon precursor, a cellulosic based carbon or carbon precursor and a ceramic or a ceramic precursor;

controlled stretching and cracking of each fiber ensemble to obtain discontinuous fibers which are parallel to each other;

intimately mixing the fibers of at least two ensembles of cracked fibers which are different from each other, to obtain a hybrid yarn in which the mixed discontinuous fibers are parallel to each other and not twisted, the mixture comprising carbon fibers or carbon precursor fibers which in the carbon state comprise at least 15% by weight, preferably at least 30% by weight, of the mixture of fibers and constitute high strength carbon fibers having a tensile strength of at least 1500 MPa, preferably at least 2000 MPa, and a modulus of at least 150 GPa, preferably at least 200 GPa; and winding the mixed discontinuous fibers with a covering yarn of sacrificial material to ensure the integrity of the hybrid yarn obtained.

The yarn ensembles are advantageously in the form of slivers and the intimate mixture of fibers of at least two slivers of fibers of different natures is effected by passage through a gill-box.

The invention will be better understood from the description below of a number of examples which is provided by way of indication and is not limiting. Reference should be made to the accompanying drawings, in which:

FIG. 1 is a flow chart illustrating a method of fabricating a brake disk of composite carbon-carbon material using a preform formed from a hybrid yarn of the invention; and FIG. 2 is a highly schematic view illustrating one mode of needling which can preferentially select certain of the constituent fibers of the yarns in a needled fiber fabric.

The following examples concern fabricating composite material brake disks which, while constituting the preferred field of application of the invention, is not an exclusive application.

In all of these examples, the method illustrated in FIG. 1 is used for fabricating a hybrid yarn, fabricating a two-dimensional fiber fabric from one or more yarns at least one of which is a hybrid yarn, fabricating a fiber preform from the two-dimensional fiber fabric, and fabricating a composite material brake disk from a preform.

In the terminology of the present description, a hybrid yarn is a yarn constituted by fibers of different natures.

To produce a hybrid yarn, ensembles of continuous filaments in the form of tows or slivers are used, each ensemble being formed from filaments of the same nature and the ensembles being selected so as to be of different natures corresponding to those forming the composition of the hybrid yarn. The numbers of filaments of the different tows or slivers are selected, depending on their diameters, to obtain the mixture of fibers in the desired proportions by weight in the hybrid yarn.

As indicated above, the hybrid yarn comprises carbon fibers or carbon precursor fibers which, in the carbon state, comprise at least 15% by weight, preferably at least 30% by weight, of the mixture of fibers and constitute high strength carbon fibers, such as polyacrylonitrile (PAN) precursor carbon fibers, or anisotropic pitch precursor carbon fibers. Further, in particular for application to brake disks, it is preferable for the hybrid yarn to comprise carbon fibers or carbon precursor fibers which, in the carbon state, comprise at least 15% by weight and preferably at least 30% by weight of low modulus carbon fibers such as phenolic precursor fibers, cellulosic precursor fibers or isotropic pitch precursor fibers.

The term "high strength carbon fibers" here means carbon fibers with a tensile strength of at least 1500 MPa, preferably at least 2000 MPa, more preferably at least 2500 MPa, and with a modulus of at least 150 GPa, preferably at least 200 GPa, more preferably at least 230 GPa. The term "low modulus carbon fibers" means carbon fibers with a Young's modulus of at most 100 MPa, preferably at most 70 MPa. Fibers other than carbon can be present, in particular ceramic fibers, such as fibers composed essentially of silicon carbide, alumina, silica, silicates, aluminosilicate, . . .

Multifilament slivers or tows of different natures, for example two slivers 10, 10', undergo a controlled stretching and cracking operation which transforms them into slivers 12, 12' formed from discontinuous fibers which are parallel to each other. A method of controlled stretching and cracking of a multifilament tow is described in FR-A-2 608 641.

The fibers of different natures in cracked slivers 12, 12' are intimately mixed to form a single sliver 14 constituted by discontinuous fibers which are parallel to each other and not twisted. This operation can be carried out by passing the cracked slivers 12, 12' through a gill-box, i.e., passing the sheet of fibers in cracked slivers 12, 12' between supply and stretch cylinders over an array of comb strips or gills. This is an operation which is well known in the textile industry.

Cohesion of the ensemble of fibers constituting sliver 14 is ensured by covering using a covering yarn 16 of sacrificial material, to obtain a covered hybrid yarn 18 (or hybrid roving yarn) in which the discontinuous fibers remain parallel to each other and not twisted. The term "sacrificial material" which constitutes the covering yarn here means any material which can be eliminated without leaving a residue on the hybrid yarn and without spoiling the fibers of the yarn. As an example, the sacrificial material could be a soluble polymer such as a polyvinyl alcohol (PVA) or a polymer which can be completely eliminated by heat treatment, such as polyvinyl acetate or polyethylene. Covering endows the hybrid yarn with the behavior required to undergo textile operations, in particular weaving. Covering is carried out using a known machine, for example the "Parafil" machine from the German company Spindelfabrike Suessen.

A two-dimensional fabric 20 is formed, for example by weaving the covered hybrid yarn 18. Other fabrics can be formed, in particular fabrics formed by knitting or braiding the covered hybrid yarn, or fabrics formed by superposition and light needling a few unidirectional sheets, for example two or three sheets, the directions of the yarns in the sheets being angularly offset from each other.

Once the fabric has been formed, the covering yarn is eliminated. When a PVA yarn is used, elimination is by washing in a water bath, draining and drying. When the covering yarn is polyvinyl acetate or polyethylene, elimination is by heat treatment.

A plurality of layers of cloth 20 are superposed and needled to form a slab 22 the thickness of which substantially corresponds to that of the brake disk to be produced. Eliminating the covering yarn allows the fibers of the hybrid yarn to expand in the cloth allowing it to be needled directly. Needling is carried out as the layers of the cloth are superposed. Each new layer is needled onto the underlying structure while keeping a constant needling depth and, after positioning and needling the last layer, several finishing needling passes can be carried out, as described in FR-A-2 584 106.

Annular preforms 24 with the approximate dimensions of the brake disks to be produced are cut from the needled slab 22.

The preforms 24 are densified by a matrix of pyrolytic carbon in a chemical vapor infiltration oven in known manner.

Densified preforms 26 are then machined to obtain brake disks with precision-ground friction surfaces and with inside or outside edges having notches for engaging rotors 28 or stators 30 with a wheel or with a fixed ring.

As already indicated, the hybrid yarn can be formed from carbon fibers and optionally from ceramic fibers or with carbon precursor fibers and optionally with ceramic precursor fibers. In the latter case, the fibers can be those obtained by spinning the initial precursor or it can be in a state intermediate between the initial state and the carbon or ceramic state. Such an intermediate state may be a pre-oxidized state or a semi-carbonized state or a semi-ceramic state. The carbon or ceramic precursor is transformed by heat treatment, which is carried out after forming the needled preform, for example before or after cutting out the needled slab 22. When heat treatment is carried out after cutting out the disk preforms, the shrinkage which accompanies precursor transformation must be taken into account. In order to avoid differential shrinkage when the fibers of the hybrid yarn are in the precursor state, care must be taken that the yarn is constituted by fibers which are all in the same precursor state or are in similar states.

EXAMPLE 1

C—C composite material brake disks were produced as follows using the operating method described with reference to FIG. 1.

A hybrid yarn was formed which comprised 75% by weight of PAN precursor carbon fibers originating from a tow of 12000 filaments (12K) sold by Tenax under the trade name "Tenax HTA 5411", and 25% by weight of phenolic precursor carbon fibers originating from a tow of 2000 (2K) filaments sold by Kynol. The PAN precursor carbon fibers had a Young's modulus of about 230 GPa and a tensile strength of about 2000 MPa, while the phenolic precursor carbon fibers had a Young's modulus of about 60 GPa and a tensile strength of about 700 MPa. By fixing the limits between the low and high modulus and between low and high strengths at about 150 GPa and 1500 MPa, it can be seen that the PAN precursor fibers were the high modulus and high strength fibers while the phenolic precursor fibers were the low modulus and low strength fibers.

The hybrid yarn obtained after controlled stretching and cracking of the tows and intimate mixing of their carbon fibers was covered with a 45 dtex count PVA covering yarn.

A satin weave cloth was produced by weaving the covered hybrid yarn. After eliminating the covering yarn by washing in water at 80° C. for 10 minutes, draining and drying, the plies of cloth were superposed and needled. Annular preforms were cut out from the slab obtained and densified by a matrix of pyrolitic carbon by chemical vapor infiltration.

After final machining, two brake disks so obtained underwent a bench test consisting of rubbing the disks against each other to simulate, in succession:

5 braking cycles corresponding to cold ground taxiing for an "Airbus A300" type aircraft;

1 normal landing cycle;

5 braking cycles corresponding to hot ground taxiing conditions; and 1 emergency braking cycle.

Disk wear was determined by measuring the reduction in thickness and the weight loss and the coefficient of friction was measured during emergency braking (high energy of more than 2500 kJ/kg). The regularity of the coefficient of friction for medium energies (about 100 kJ/kg to 200 kJ/kg) was also examined.

The Table given after the Examples shows qualitative results in comparison with reference results which were obtained by carrying out the same bench friction test on two brake disks produced as in Example 1 with the only exception being that the carbon fiber yarn used was not a hybrid yarn but a yarn formed exclusively from PAN precursor carbon fibers (no intimate mixing of fibers) and that the needled annular preforms underwent heat treatment at 1600° C. before densification.

EXAMPLE 2

The method of Example 1 was used, but prior to densification, the annular brake disk preforms underwent vacuum heat treatment at 1600° C. for 30 minutes.

This heat treatment stabilized the pre-oxidized PAN carbon precursor fibers by eliminating residual nitrogen and thus stabilizing the preforms both chemically and dimensionally.

EXAMPLE 3

The method of Example 1 was followed, using a hybrid yarn comprising 50% by weight of PAN carbon precursor fibers originating from a 12K "Tenax HTA 5411" type tow and 50% by weight of anisotropic pitch carbon precursor fibers originating from a 2K filament tow sold by Japanese company Nippon Oil under the trade name "XNC 15". The anisotropic pitch carbon precursor filaments had a diameter of 10 $\mu$m, a Young's modulus of 160 GPa and a tensile strength of 2000 MPa.

The diameter of the pitch precursor fibers was such that in practice they were not entrained but were possibly broken by the needles during needling, so that essentially PAN precursor fibers were entrained.

EXAMPLE 4

The method of Example 3 was used, but prior to densification the annular brake disk preforms underwent vacuum heat treatment at 1600° C. for 10 minutes. This heat treatment stabilized the PAN carbon precursor fibers and raised the modulus and strength of the anisotropic pitch carbon precursor fibers.

EXAMPLE 5

The method of Example 4 was followed but the heat treatment temperature was raised to 2200° C. to further increase the modulus of the pitch precursor fibers.

EXAMPLE 6

The method of Example 3 was followed, but anisotropic pitch carbon precursor fibers with a diameter of 7 $\mu$m originating from a 2K filament tow sold by Japanese company Nippon Steel under the trade name "NUP 9 Eskainos" were used. The filaments had a Young's modulus of 160 GPa and a tensile strength of 2500 MPa.

The diameter of the pitch precursor fibers allowed them to be entrained by the needles during needling.

EXAMPLE 7

The method of Example 6 was followed but before densification, the annular brake disks preforms underwent vacuum heat treatment at 1600° C., as in Example 4.

EXAMPLE 8

The method of Example 7 was followed but the heat treatment temperature was raised to 2200° C.

EXAMPLE 9

The method of Example 1 was followed, using a hybrid yarn comprising 85% by weight of PAN carbon precursor fibers originating from a 12K "Tenax HTA 5411" type tow and 15% by weight of fibers composed essentially of silicon carbide having an oxygen content of 12% by weight. These fibers had a diameter of 8 $\mu$m, and so were needlable, and they are sold by Japanese company UBE under the trade name "Tyranno Lox M", not oiled.

EXAMPLE 10

The method of Example 9 was followed, replacing the "Tyranno Lox M" fibers with silicon carbide fibers with a residual oxygen content of 0.4% by weight sold by Japanese company Nippon Oil under the trade name "Nicalon". These fibers had a diameter of 14 $\mu$m and thus were practically incapable of being needled.

EXAMPLE 11

The method of Example 10 was used, but prior to densification, the annular brake disk preforms underwent vacuum heat treatment at 1600° C. for 30 minutes. This heat treatment stabilized the carbon fibers and the silicon carbide fibers, with the low oxygen content of the silicon carbide allowing such stabilization.

EXAMPLE 12

The method of Example 1 was followed, using a hybrid yarn comprising 50% by weight of anisotropic pitch carbon precursor fibers from Example 6 and 50% by weight of phenolic carbon precursor fibers from Example 1.

EXAMPLE 13

The method of Example 12 was used, but prior to densification, the annular brake disk preforms underwent vacuum heat treatment at 1600° C. for 30 minutes. This treatment increased the modulus and strength of the anisotropic pitch carbon precursor fibers.

EXAMPLE 14

The method of Example 13 was used, but the heat treatment temperature was raised to 2200° C., which further increased the modulus of the pitch precursor fibers.

EXAMPLE 15

The method of Example 3 was used, but the anisotropic pitch carbon precursor fibers were replaced by cellulosic carbon precursor fibers with a tensile strength of 800 MPa and a Young's modulus of 60 GPa.

TABLE

| Example | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Wear | 2 | 2 | 1 | 2 | 1 | 1 | 2 | 1 | 2 | 2 | 1 | 3 | 2 | 1 | 1 |
| HE COF | | = | 2 | 1 | 1 | = | 1 | 1 | = | 2 | 2 | 3 | 1 | 1 | 2 | - |
| Regularity of ME COF | 1 | = | = | = | = | = | = | = | 1 | 2 | 2 | 1 | = | = | 3 |

In the table:
HE COF = high energy coefficient of friction
ME COF = medium energy coefficient of friction
Regarding wear:
symbol = indicates a wear equivalent to ± about 10% relative to the reference;
symbol 1 indicates a wear value reduced by 10% to 20%;
symbol 2 indicates a wear value reduced by 20% to 30%; and
symbol 3 indicates a wear value reduced by more than 30%.
Regarding the coefficient of friction:
symbol − indicates a reduction in the range 5% to 10% relative to the reference results;
symbol = indicates a value equivalent to ± about 5%;
symbol 1 indicates an increase in the range 5% to 10%;
] symbol 2 indicates an increase in the range 10% to 15%; and
] symbol 3 indicates an increase of more than 15%.

In the above Examples, a single hybrid yarn was used throughout for fabricating the two-dimensional fiber fabric which was used in turn to produce the preforms.

However, different hybrid yarns can be used, e.g. in a woven cloth, by using first hybrid yarns as the warp and others as the weft or, in unidirectional superposed sheets, by using first hybrid yarns for one sheet and others for another sheet. It is also envisageable in a cloth or in unidirectional sheets that a hybrid yarn could be used in one direction with a non hybrid yarn in another direction.

The use of different yarns in two directions in a two-dimensional fiber fabric means that fibers which can be entrained by needling can be selected by choosing the orientation of the needles.

Thus, as shown in highly schematic FIG. 2, a forked needle 32 with the plane of the fork 32a parallel to the weft yarn 18a of cloth 20 will in practice not lift fibers in the weft yarn but will lift fibers in the warp yarn 18b almost exclusively. If it is desired for the fibers entrained by needling to have a particular characteristic, for example a low modulus for reasons given above in the case of brake disks, all that is needed is a warp yarn 18b comprising a relatively high proportion of such fibers of not too large a diameter. It can also be arranged that only these fibers will be entrained if the other fibers selected for the warp yarn have a diameter which is sufficiently high to render them non needlable. A similar result can be obtained with a barbed needle provided that the barbs are in the same plane.

We claim:

1. A yarn for fabricating fiber preforms for composite material parts, the yarn comprising discontinuous parallel fibers which are not twisted and which are held together by a covering yarn of sacrificial material wound around the fibers, characterized in that the yarn is a hybrid yarn in which the fibers comprise an intimate mixture of fibers of at least two different natures selected from pre-oxidized polyacrylonitrile based carbon fibers or carbon precursor fibers, anisotropic pitch based carbon fibers or carbon precursor fibers, isotropic pitch based carbon fibers or carbon precursor fibers, phenolic based carbon fibers or carbon precursor fibers, cellulosic based carbon fibers or carbon precursor fibers, and ceramic fibers or ceramic precursor fibers, and in that the mixture of fibers comprises carbon fibers or carbon precursor fibers which, in the carbon state, comprise at least 15% by weight of the mixture of fibers and constitute high strength carbon fibers having a tensile strength of at least 1500 MPa and a modulus of at least 150 GPa.

2. A yarn according to claim 1, characterized in that the fibers which, in the carbon state, are high strength fibers, are selected from fibers based on a polyacrylonitrile precursor and fibers based on an anisotropic pitch precursor.

3. A yarn according to claim 1, characterized in that the mixture of fibers comprises carbon fibers or carbon precursor fibers which, in the carbon state, are high strength carbon fibers and which comprise at least 30% by weight of the mixture of fibers.

4. A yarn according to claim 1, characterized in that in the carbon state, the high strength fibers have a tensile strength of at least 2000 MPa.

5. A yarn according to claim 1, characterized in that in the carbon state, the high strength fibers have a modulus of at least 200 GPa.

6. A yarn according to claim 1, characterized in that the mixture of fibers comprises carbon fibers or carbon precursor fibers which, in the carbon state, comprise at least 15% by weight of the mixture of fibers and constitute low modulus carbon fibers, with a Young's modulus of at most 100 GPa.

7. A yarn according to claim 6, characterized in that in the carbon state, the low modulus carbon fibers comprise at least 30% by weight of the fiber mixture.

8. A yarn according to claim 6, characterized in that the fibers which, in the carbon state, are low modulus carbon fibers, are selected from phenolic precursor fibers, isotropic pitch precursor fibers and cellulosic precursor fibers.

9. A yarn according to claim 1, characterized in that the ceramic fibers or ceramic precursor fibers are silicon carbide fibers in the ceramic state.

10. A method of fabricating fiber preforms for composite material parts, comprising the following steps consisting of:

providing a yarn comprising parallel discontinuous fibers which are not twisted held by a covering yarn of sacrificial material wound around the fibers;

forming a two-dimensional fiber fabric using said yarn;

superposing plies formed by said fiber fabric;

eliminating the covering yarn; and needling the superposed plies to connect them to each other by means of fibers pulled from the yarns and extending through a plurality of superposed plies; characterized in that at least a portion of the two-dimensional fiber fabric is formed from a hybrid yarn according to claim 1.

11. A method according to claim 10, characterized in that the needled preform is heat treated at a temperature of more than 1300° C.

12. A method according to claim 10, characterized in that the needled preform is heat treated at a temperature of about 1600° C.

13. A method according to claim 10, for fabricating fiber preforms for composite material friction disks, characterized in that the plies are parallel to the friction surfaces of the disks.

14. A method according to claim 13, characterized in that at least a portion of the two-dimensional fiber fabric is formed by a hybrid yarn comprising low modulus carbon fibers having a Young's modulus of at most 100 GPa, and with the diameter of the constituent fibers of the hybrid yarn and/or the orientation of the needles used during needling being selected so as to preferentially entrain the low modulus carbon fibers during needling.

15. A method according to claim 14, characterized in that a hybrid yarn comprising high modulus carbon fibers is used, with a Young's modulus of at least 150 GPa, and with a diameter of at least 8 $\mu$m.

16. A method according to claim 14, characterized in that the two-dimensional fiber fabric is formed by yarns extending in at least two different directions and the yarns oriented in a first direction comprise a mixture of fibers containing low modulus carbon fibers having a Young's modulus of at most 100 GPa, and in that needling is carried out using needles with an orientation which is selected so that they preferentially catch yarn fibers which are oriented in the first direction.

17. A method of fabricating a yarn according to claim 1, characterized in that it comprises the following steps which consist of:

providing ensembles of continuous filaments, each ensemble being constituted by filaments of the same nature selected from a polyacrylonitrile based carbon or carbon precursor, an anisotropic pitch based carbon or carbon precursor, an isotropic pitch based carbon or carbon precursor, a phenolic based carbon or carbon precursor, a cellulosic based carbon or carbon precursor or a ceramic or a ceramic precursor;

subjecting each ensemble of fibers to controlled stretching and cracking to obtain discontinuous parallel fibers;

intimately mixing the fibers of at least two ensembles of cracked fibers of natures which are different from each other, to obtain a hybrid yarn in which the mixed discontinuous fibers are parallel to each other and not twisted, the mixture comprising carbon fibers or carbon precursor fibers which, in the carbon state, comprise at least 15% by weight of the mixture of fibers and constitute high strength carbon fibers having a tensile strength of at least 1500 MPa and a modulus of at least 150 GPa; and winding the discontinuous mixed fibers with a covering yarn of sacrificial material to ensure the integrity of the hybrid yarn obtained.

18. A method according to claim 17, characterized in that the intimate mixture of fibers is produced by passing the ensemble of cracked fibers through a gill-box.

19. A method according to claim 17, characterized in that the fibers which, in the carbon state, are high strength fibers are selected from preoxidized polyacrylonitrile precursor fibers and anisotropic pitch precursor fibers.

20. A method according to claim 17, characterized in that the mixture of fibers comprises carbon fibers or carbon precursor fibers which, in the carbon state, comprise at least 30% by weight of the mixture of fibers and constitute high strength carbon fibers.

21. A method according to claim 17, characterized in that the mixture of fibers comprises carbon fibers or carbon precursor fibers which, in the carbon state, comprise at least 15% by weight of the mixture of fibers and constitute low modulus carbon fibers having a Young's modulus of at most 100 GPa.

22. A method according to claim 21, characterized in that the mixture of fibers comprises carbon fibers or carbon precursor fibers which, in the carbon state, comprise at least 30% by weight of the mixture of fibers and constitute low modulus carbon fibers.

23. A method according to claim 21, characterized in that the fibers which, in the carbon state, are low modulus carbon fibers, are selected from phenolic precursor fibers, isotropic pitch carbon precursor fibers and cellulosic precursor fibers.

24. A method according to claim 17, characterized in that the ceramic fibers or ceramic precursor fibers are silicon carbide fibers in the ceramic state.

25. A yarn according to claim 1, characterized in that;

the mixture of fibers comprises carbon fibers or carbon precursor fibers which, in the carbon state, are high strength carbon fibers and which comprise at least 30% by weight of the mixture of fibers;

the carbon state, the high strength fibers have a tensile strength of at least 2000 MPa;

the carbon state, the high strength fibers have a modulus of at least 200 GPa;

the mixture of fibers comprises carbon fibers or carbon precursor fibers which, in the carbon state, comprise at least 15% by weight of the mixture of fibers and constitute low modulus carbon fibers, with a Young's modulus of at most 100 GPa;

the carbon state, the low modulus carbon fibers comprise at least 30% by weight of the fiber mixture;

the fibers which, in the carbon state, are low modulus carbon fibers, are selected from phenolic precursor fibers, isotropic pitch precursor fibers and cellulosic precursor fibers; and the ceramic fibers or ceramic precursor fibers are silicon carbide fibers in the ceramic state.

26. A method of fabricating fiber preforms for composite material parts, comprising the following steps consisting of:

providing a yarn according to claim 1 comprising parallel discontinuous fibers which are not twisted held by a covering yarn of sacrificial material wound around the fibers;

forming a two-dimensional fiber fabric using said yarn;

superimposing plies formed by said fiber fabric;

eliminating the covering yarn; and needling the superposed plies to connect them to each other by means of fibers pulled from the yarns and extending through a plurality of superposed plies; characterized in that at least a portion of the two-dimensional fiber fabric is formed from a hybrid yarn, said yarn characterized in that:

the mixture of fibers comprises carbon fibers or carbon precursor fibers which, in the carbon state, are high strength carbon fibers and which comprise at least 30% by weight of the mixture of fibers;

the carbon state, the high strength fibers have a tensile strength of at least 2000 MPa;

the carbon state, the high strength fibers have a modulus of at least 200 GPa;

the mixture of fibers comprises carbon fibers or carbon precursor fibers which, in the carbon state, comprise at least 15% by weight of the mixture of fibers and constitute low modulus carbon fibers, with a Young's modulus of at most 100 GPa;

the carbon state, the low modulus carbon fibers comprise at least 30% by weight of the fiber mixture;

the fibers which, in the carbon state, are low modulus carbon fibers, are selected from phenolic precursor fibers, isotropic pitch precursor fibers and cellulosic precursor fibers; and the ceramic fibers or ceramic precursor fibers are silicon carbide fibers in the ceramic state;

and further characterized in that:

the needled preform is heat treated at a temperature of about 1600°.

27. A method according to claim 10, for fabricating fiber preforms for composite material friction disks, characterized in that:

the plies are parallel to the friction surfaces of the disks;

at least a portion of the two-dimensional fiber fabric is formed by a hybrid yarn comprising low modulus carbon fibers having a Young's modulus of at most 100 GPa, and with the diameter of the constituent fibers of the hybrid yarn and/or the orientation of the needles used during needling being selected so as to preferentially entrain the low modulus carbon fibers during needling;

a hybrid yarn comprising high modulus carbon fibers is used, with a Young's modulus of at least 150 GPa, and with a diameter of at least 8 μm; and the two-dimensional fiber fabric is formed by yarns extending in at least two different directions and the yarns oriented in a first direction comprise a mixture of fibers containing low modulus carbon fibers having a Young's modulus of at most 100 GPa, and in that needling is carried out using needles with an orientation which is selected so that they preferentially catch yarn fibers which are oriented in the first direction.

28. A method of fabricating a yarn according to claim 25, characterized in that it comprises the following steps which consist of:

providing ensembles of continuous filaments, each ensemble being constituted by filaments of the same nature selected from a polyacrylonitrile based carbon or carbon precursor, an anisotropic pitch based carbon or carbon precursor, an isotropic pitch based carbon or carbon precursor, a phenolic based carbon or carbon precursor, a cellulosic based carbon or carbon precursor or a ceramic or a ceramic precursor;

subjecting each ensemble of fibers to controlled stretching and cracking to obtain discontinous parallel fibers;

intimately mixing the fibers of at least two ensembles of cracked fibers of natures which are different from each other, to obtain a hybrid yarn in which the mixed discontinuous fibers are parallel to each other and not twisted, the mixture comprising carbon fibers or carbon precursor fibers which, in the carbon state, comprise at least 15% by weight of the mixture of fibers and constitute high strength carbon fibers having a tensile strength of at least 1500 MPa and a modulus of at least 150 GPa; and winding the discontinuous mixed fibers with a covering yarn of sacrificial material to ensure the integrity of the hybrid yarn obtained;

wherein the intimate mixture of fibers is produced by passing the ensemble of cracked fibers through a gill-box;

wherein the fibers which, in the carbon state, are high strength fibers are selected from pre-oxidized polyacrylonitrile precursor fibers and anisotropic pitch precursor fibers;

wherein the mixture of fibers comprises carbon fibers or carbon precursor fibers which, in the carbon state, comprise at least 30% by weight of the mixture of fibers and constitute high strength carbon fibers;

wherein the mixture of fibers comprises carbon fibers or carbon precursor fibers which, in the carbon state, comprise at least 15% by weight of the mixture of fibers and constitute low modulus carbon fibers having a Young's modulus of at most 100 GPa;

wherein the mixture of fibers comprises carbon fibers or carbon precursor fibers which, in the carbon state, comprise at least 30% by weight of the mixture of fibers and constitute low modulus carbon fibers;

wherein the fibers which, in the carbon state, are low modulus carbon fibers, are selected from phenolic precursor fibers, isotropic pitch carbon precursor fibers and cellulosic precursor fibers; and wherein the ceramic fibers or ceramic precursor fibers are silicon carbide fibers in the ceramic state.

\* \* \* \* \*

UNITED STATES PATENT AND TRADEMARK OFFICE
CERTIFICATE OF CORRECTION

PATENT NO. : 6,051,313  
DATED : April 18, 2000  
INVENTOR(S) : Pierre Olry et al.

It is certified that error appears in the above-identified patent and that said Letters Patent is hereby corrected as shown below:

<u>Title page,</u>  
Item [75] Inventors, "Lyons" should read -- Lyon --.

Signed and Sealed this

Eighth Day of January, 2002

*Attest:*

*Attesting Officer*

JAMES E. ROGAN  
*Director of the United States Patent and Trademark Office*